US009659444B2

(12) United States Patent
Norris

(10) Patent No.: US 9,659,444 B2
(45) Date of Patent: May 23, 2017

(54) GAMING SYSTEM AND METHOD FOR PROVIDING CASHABLE AND NON-CASHABLE CREDITS UPON CASH-OUT

(71) Applicant: IGT, Las Vegas, NV (US)

(72) Inventor: Donald E. Norris, Las Vegas, NV (US)

(73) Assignee: IGT, Las Vegas, NV (US)

( * ) Notice: Subject to any disclaimer, the term of this patent is extended or adjusted under 35 U.S.C. 154(b) by 525 days.

(21) Appl. No.: 14/032,320

(22) Filed: Sep. 20, 2013

(65) Prior Publication Data

US 2015/0087396 A1 Mar. 26, 2015

(51) Int. Cl.
*A63F 13/00* (2014.01)
*G07F 17/32* (2006.01)

(52) U.S. Cl.
CPC .......... *G07F 17/3244* (2013.01); *G07F 17/32* (2013.01)

(58) Field of Classification Search
CPC ............................. G07F 17/32; G07F 17/3248
USPC ................................................ 463/16–20, 25
See application file for complete search history.

(56) References Cited

U.S. PATENT DOCUMENTS 5,092,598 A 3/1992 Kamille
5,265,874 A 11/1993 Dickinson et al.
5,326,104 A 7/1994 Pease et al.
5,398,932 A 3/1995 Eberhardt et al.
5,833,537 A 11/1998 Barrie
5,931,467 A 8/1999 Kamille
6,107,913 A 8/2000 Gatto et al.
6,113,098 A 9/2000 Adams
6,251,014 B1 6/2001 Stockdale et al.
6,280,326 B1 8/2001 Saunders
6,315,291 B1 11/2001 Moody
6,346,043 B1 2/2002 Colin et al.
6,364,313 B1 4/2002 Moody
(Continued)

OTHER PUBLICATIONS

Florida Lottery Second Chance Drawings & Promotions, RULES—Guy Harvey® Sportsman's Paradise Second Chance Promotion Official Rules, available at http://web.archive.org/web/20130806224151/https://secondchance.flalottery.com/secondchance/rules_2013guyHarvey.do, Aug. 6, 2013 (4 pages).
(Continued)

*Primary Examiner* — Omkar Deodhar
*Assistant Examiner* — Ross Williams
(74) *Attorney, Agent, or Firm* — Neal, Gerber & Eisenberg LLP

(57) ABSTRACT

Gaming systems and methods for providing a customer with additional non-cashable credits upon completion of the game are provided herein. The gaming machine includes a game controller that is configured to receive a player input to play a wagering game on the gaming machine. The game controller is also configured to generate results for the wagering game, wherein the results include credits won or lost. The game controller is configured to add or subtract the credits won or lost to the player's total credit balance and provide the player with an amount of additional non-cashable credits upon ending the game, wherein the player must forgo a portion of their remaining credits in order to receive the amount of additional non-cashable credits, and wherein the non-cashable credits cannot be used with the same or another gaming machine without an additional input of currency into the gaming machine by the player.

27 Claims, 5 Drawing Sheets

(56) References Cited

U.S. PATENT DOCUMENTS 6,558,256 B1 5/2003 Saunders
6,579,179 B2 6/2003 Poole et al.
6,669,599 B2 12/2003 Iwase et al.
6,676,522 B2 1/2004 Rowe et al.
6,682,421 B1 1/2004 Rowe et al.
6,726,563 B1 4/2004 Baerlocher et al.
6,749,502 B2 6/2004 Baerlocher
6,752,312 B1 6/2004 Chamberlain et al.
6,892,182 B1 5/2005 Rowe et al.
6,896,618 B2 5/2005 Benoy et al.
6,905,411 B2 6/2005 Nguyen et al.
6,964,416 B2 11/2005 McClintic et al.
6,997,805 B2 2/2006 Vancura
7,040,983 B2 5/2006 Dolloff et al.
7,128,646 B2 10/2006 Baerlocher et al.
7,179,168 B1 2/2007 Tulley et al.
7,328,838 B2 2/2008 Brosnan et al.
7,331,520 B2 2/2008 Silva et al.
7,399,226 B2 7/2008 Mishra
7,559,462 B2 7/2009 Brosnan et al.
7,572,183 B2 8/2009 Olivas et al.
7,674,180 B2 3/2010 Graham et al.
7,686,687 B2 3/2010 Cannon et al.
7,722,453 B2 5/2010 Lark et al.
7,740,243 B1 6/2010 Kean
7,749,079 B2 7/2010 Chamberlain et al.
7,771,277 B2 8/2010 Chamberlain et al.
7,785,193 B2 8/2010 Paulsen et al.
7,789,755 B2 9/2010 Davis et al.
7,833,102 B2 11/2010 Beadell et al.
7,862,430 B2 1/2011 Baerlocher et al.
7,874,908 B2 1/2011 Walker et al.
7,883,409 B2 2/2011 Little et al.
7,887,404 B2 2/2011 Saffari et al.
7,909,699 B2 3/2011 Parrott et al.
7,967,677 B2 6/2011 Baerlocher et al.
7,985,133 B2 7/2011 Baerlocher et al.
7,993,197 B2 8/2011 Kaminkow
8,002,620 B2 8/2011 Nicely et al.
8,043,152 B2 10/2011 Walker et al.
8,092,302 B2 1/2012 Cuddy et al.
8,096,884 B2 1/2012 Beadell et al.
8,142,280 B2 3/2012 Walker et al.
8,152,630 B2 4/2012 Cohen
8,177,624 B2 5/2012 Graham et al.
8,177,637 B2 5/2012 Beadell et al.
8,221,223 B2 7/2012 Walker et al.
8,241,111 B2 8/2012 Manfredi et al.
8,277,302 B2 10/2012 Walker et al.
8,308,554 B2 11/2012 Rowe et al.
8,376,836 B2 2/2013 Baerlocher et al.
8,382,572 B2 2/2013 Hoffman et al.
8,419,526 B1 4/2013 Cannon et al.
8,425,303 B2 4/2013 Kennedy et al.
8,602,874 B2 12/2013 Rowe et al.
8,613,659 B2 12/2013 Nelson et al.
8,628,413 B2 1/2014 LeMay et al.
2003/0050111 A1 3/2003 Saffari et al.
2004/0033095 A1 2/2004 Saffari et al.
2004/0142744 A1 7/2004 Atkinson et al.
2004/0176154 A1 9/2004 Finnochio
2004/0176158 A1 9/2004 Baldwin
2005/0054439 A1 3/2005 Rowe et al.
2005/0107163 A1 5/2005 Nguyen et al.
2005/0215316 A1 9/2005 Rowe et al.
2006/0012116 A1 1/2006 Lovell, Sr.
2006/0046827 A1 3/2006 Saffari et al.
2006/0046842 A1 3/2006 Mattice et al.
2006/0068898 A1* 3/2006 Maya ...................... G07F 17/32
463/25
2006/0105836 A1 5/2006 Walker et al.
2006/0154723 A1 7/2006 Saffari et al.
2007/0060274 A1* 3/2007 Rowe ...................... G07F 17/32
463/16
2007/0106553 A1 5/2007 Jordan et al.
2007/0117608 A1 5/2007 Roper et al.
2008/0026823 A1 1/2008 Wolf et al.
2008/0039190 A1 2/2008 Walker et al.
2008/0045299 A1 2/2008 Bennett et al.
2008/0070652 A1 3/2008 Nguyen et al.
2008/0076528 A1 3/2008 Nguyen et al.
2008/0076542 A1 3/2008 Iddings et al.
2008/0113715 A1 5/2008 Beadell et al.
2008/0113716 A1 5/2008 Beadell et al.
2008/0113821 A1 5/2008 Beadell et al.
2008/0132314 A1 6/2008 Robb et al.
2008/0214310 A1 9/2008 Brunet De Courssou et al.
2008/0234029 A1 9/2008 Cannon et al.
2008/0248865 A1 10/2008 Tedesco et al.
2008/0274792 A1 11/2008 Walker et al.
2009/0131155 A1 5/2009 Hollibaugh et al.
2009/0156303 A1 6/2009 Kiely et al.
2010/0081497 A1 4/2010 Wolf et al.
2010/0113122 A1 5/2010 Walker et al.
2010/0137056 A1 6/2010 Hoffman et al.
2011/0003627 A1 1/2011 Nicely et al.
2012/0040751 A1 2/2012 Peters
2012/0077578 A1 3/2012 Walker et al.
2012/0214580 A1 8/2012 Hoffman et al.
2013/0065668 A1 3/2013 LeMay et al.
2013/0065678 A1 3/2013 Nelson et al.
2013/0065686 A1 3/2013 LeMay et al.
2013/0079098 A1 3/2013 Nicely et al.
2013/0079123 A1 3/2013 Nicely et al.
2013/0095904 A1 4/2013 Cannon et al.
2014/0295932 A1 10/2014 Irwin, Jr.

OTHER PUBLICATIONS

Hollywood Casino, Texas Hold-Em Bad Beat Jackpot General Rules, available at http://web.archive.org/web/20130401055415/http://www.hollywoodcasinotoledo.com/Casino/Poker%20Room/Bad%20Beat%20Jackpot%20Rules, Apr. 1, 2013 (2 pages).

* cited by examiner

GAMING SYSTEM AND METHOD FOR PROVIDING CASHABLE AND NON-CASHABLE CREDITS UPON CASH-OUT

BACKGROUND

Casinos and entertainment centers employ several techniques in order to keep patrons and attract new patrons. For example, many casinos offer beverage discounts and/or various forms of entertainment in order to attract potential customers. One popular form of attracting players is offering non-cashable promotional credits.

Non-cashable promotional credits refer to credits which cannot be redeemed for cash, but which game players can use to, e.g., play their favorite gaming machines or for other casino services. Players tend to like promotional credits because they allow them to play their favorite games longer and, typically, are designated in amounts similar to currency, which makes such credits feel like "free money." Moreover, by playing the game longer, players typically feel like they have a greater chance of winning. In comparison, casino and entertainment center operators like non-cashable promotional credits because they can be guaranteed to be used only in their establishments, tend to keep customers in their establishments longer, are less expensive than cashable credits, and can expire if they are not used within a set amount of time.

SUMMARY

An exemplary embodiment relates to a gaming machine. The gaming machine includes a cabinet. The gaming machine further includes a display coupled to the cabinet. The gaming machine includes a user input mechanism coupled to the cabinet. The gaming machine includes a game controller coupled to the cabinet. The game controller is configured to receive a player input to play a wagering game on the gaming machine, wherein the player input comprises a wager. The game controller is further configured to determine the player's initial total credit balance based on the input. The game controller is also configured to generate results for the wagering game, wherein the results include credits won or lost based on the wager. The game controller is also configured to add or subtract the credits won or lost to the player's total credit balance and provide the player with an amount of additional non-cashable credits upon ending the game, wherein the player must forgo a portion of their remaining credits in order to receive the amount of additional non-cashable credits, and wherein the non-cashable credits cannot be used with the same or another gaming machine without an additional input of currency into the gaming machine by the player.

Another exemplary embodiment relates to a computer-implemented method for providing additional credits to a player at a gaming machine. The method includes receiving player input to play a wagering game on the gaming machine, wherein the player input comprises a wager. The method further includes determining the player's total credit balance based on the input. The method also includes generating results for the wagering game, wherein the results include credits won or lost based on the wager. The method also includes adding or subtracting the credits won or lost to the player's total credit balance and providing the player with an amount of additional non-cashable credits upon ending the game, wherein the player must forgo a portion of their remaining credits in order to receive the amount of additional non-cashable credits, and wherein the non-cashable credits cannot be used with the same or another gaming machine without an additional input of currency into the gaming machine by the player.

Yet another exemplary embodiment relates to non-transitory computer readable media with computer-executable instructions embodied thereon. The instructions, when executed by a processor, cause the processor to perform operations. The operations include receiving a player input to play a wagering game on a gaming machine, wherein the player input comprises a wager. The operations further include determining the player's total credit balance based on the input. The operations also include generating results for the wagering game, wherein the results include credits won or lost based on the wager. The operations also include adding or subtracting the credits won or lost to the player's total credit balance and providing the player with an amount of additional non-cashable credits upon ending the game, wherein the player must forgo a portion of their remaining credits in order to receive the amount of additional non-cashable credits, and wherein the non-cashable credits cannot be used with the same or another gaming machine without an additional input of currency into the gaming machine by the player.

Still another exemplary embodiment relates to a controller for a gaming machine. The controller includes a processor. The processor is configured to receive a player input to play a wagering game on a gaming machine, wherein the player input comprises a wager. The processor is further configured to determine the player's total credit balance based on the input. The processor is also configured to generate results for the wagering game, wherein the results include credits won or lost based on the wager. The processor is also configured to add or subtract the credits won or lost to the player's total credit balance and provide the player with an amount of additional non-cashable credits upon ending the game, wherein the player must leave a portion of their remaining credits in order to receive the amount of additional non-cashable credits, and wherein the non-cashable credits cannot be used with the same or another gaming machine without an additional input of currency into the gaming machine by the player.

BRIEF DESCRIPTION OF THE FIGURES

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described implementations. It may be apparent, however, to one skilled in the art that the described implementations may be practiced without some or all of these specific details. In other instances, some process steps have not been described in detail in order to avoid unnecessarily obscuring the underlying concept.

Gaming systems and methods that encourage and attract a player to continue to and begin to play a gaming machine are described herein. According to various embodiments, electronic gaming machines, such as those used in casinos and other entertainment locations, may be configured to provide a player with various types of cash out options. For example, if a player has an above-zero credit balance, that player may choose to "cash out," wherein the electronic gaming machine will disburse that player's remaining credit balance to the player. The disbursement can take the form of physical currency, credits to the player's account, tokens, prizes, etc. As described in more detail below, according to an exemplary embodiment, the arrangement described herein provides for systems and methods of providing a player with the option to cash out their remaining credit balance for a combination of cash and additional non-cashable credits.

According to an exemplary embodiment, a player inputs currency into an electronic gaming machine for credits. In addition to the insertion of physical currency, the currency input can be via an account card, ticket, and/or loyalty card, which the gaming machine then converts into usable credits for game play. Typically, the more currency inputted, the more credits that will be available for wagering. The player then chooses how many credits to wager, based on their available amount. Electronic gaming machines usually have differing threshold amounts of credit requirements for playing the wagering game on the machine. For example, one slot machine may require a minimum of two credits to play whereas another slot machine may require four credits to play. Additionally, the currency exchange rates may differ based on the game being played, the casino rules, etc. For example, one game may equate four credits with one dollar whereas another game may equate one credit with one dollar. When the player chooses to cease playing the game, assuming there is a remaining credit balance, the player typically cashes out. According to an exemplary embodiment, the player has the option of receiving less currency than their remaining credit balance in exchange for additional non-cashable credits. The non-cashable credits may be denominated in dollars or other local currency. The non-cashable credits may be in excess of the currency forgone by the player to receive the non-cashable credits. The non-cashable credits cannot be redeemed for cash, but can be used to play more games or in other ways within the casino.

Figure 1:
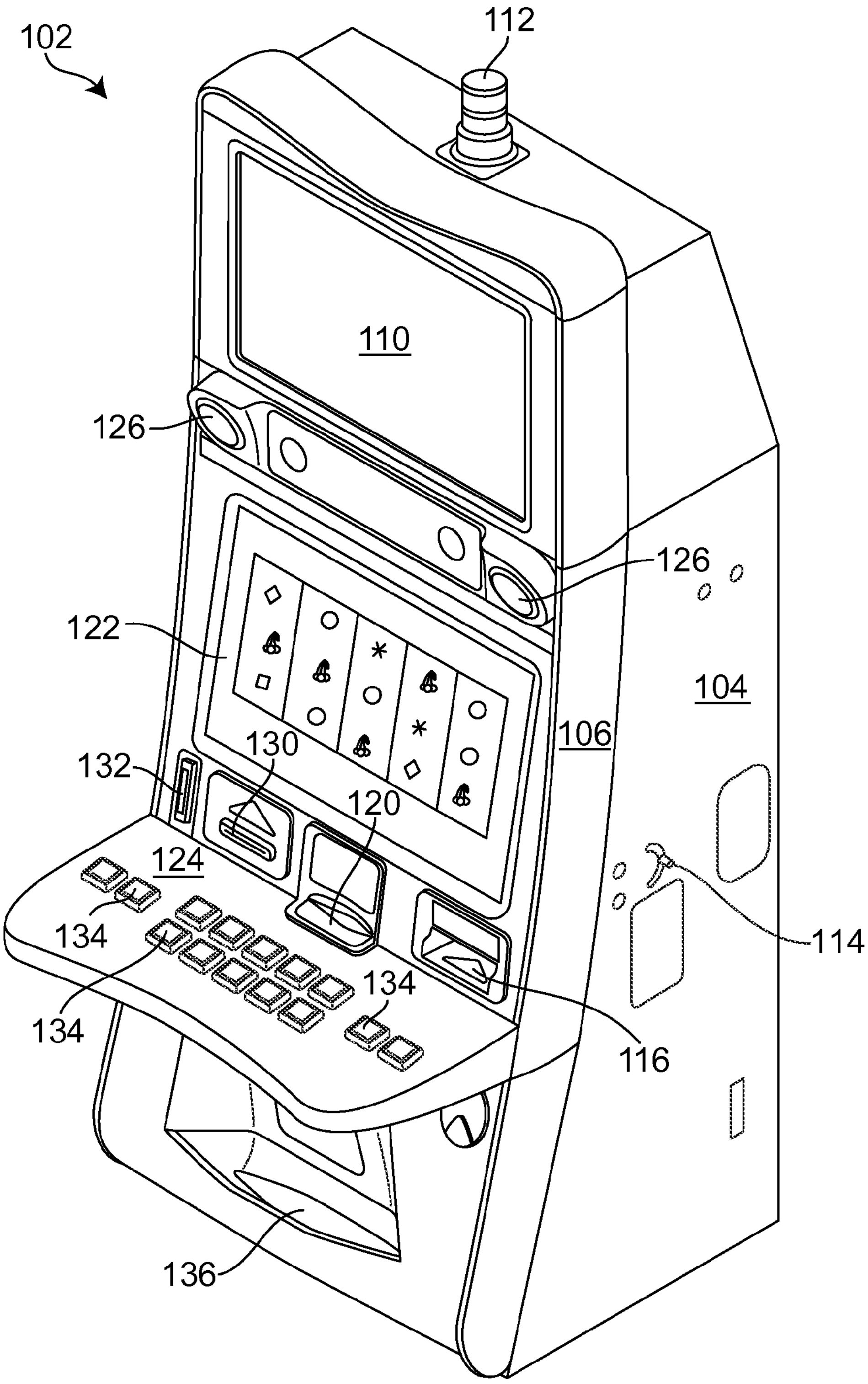
FIG. 1 is a perspective view of a gaming machine, according to an exemplary embodiment.

Referring to FIG. 1, a perspective view of a gaming machine 102 is shown according to an exemplary embodiment. Gaming machine 102 includes main cabinet 104. Main cabinet 104 provides a secure enclosure that prevents tampering with device components, such as a game controller (not shown) located within the interior of main cabinet 104. Main cabinet 104 includes an access mechanism, such as a door 106, which allows the interior of gaming machine 102 to be accessed. Actuation of door 106 may be controlled by locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 includes any number of user interface devices that convey sensory information to a user and/or receive input from the user. For example, gaming machine 102 may include a first electronic display 110, a second electronic display 122, speakers 126, and/or a candle device 112 to convey information to the user of gaming machine 102. Gaming machine 102 includes console 124 having one or more inputs 134 (e.g., buttons, track pads, etc.) configured to receive input from a user. A controller (not shown) within gaming machine 102 may run a game, such as a wager-based game, in response to receiving input from a user via inputs 134 or displays 110, 122. For example, inputs 134 may be operated to place a wager in the game and to run the game. In response, the controller may cause reels shown on display 122 to spin, such as with a slot game, and/or display 110 to display the results of the game.

Gaming machine 102 may also include devices for conducting a wager-based game. For example, gaming machine 102 may include ticket acceptor 116 and printer 120. In various embodiments, gaming machine 102 may be configured to run on credits that may be redeemed for money and/or other forms of prizes. Ticket acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In some cases, gaming machine 102 may be configured to receive and/or dispense physical money or tokens used by the gaming establishment. For example, gaming machine 102 may include an acceptor 132 configured to receive coins or tokens. Similarly, gaming machine 102 may include a bill acceptor. For example, acceptor 116 may be configured to accept bills in addition to, or in lieu of, tickets. Money or tokens received by gaming machine 102 may be converted into game credits. In some embodiments, gaming machine 102 may be configured to dispense money or tokens via a coin hopper 136. For example, a player may cash out of gaming machine 102 by converting any remaining game credits into money or tokens dispensed via coin hopper 136. In some cases, a threshold amount may be used by gaming machine to control whether a redeemable ticket is printed by printer 120 or a payout is paid via coin hopper 136 (e.g., small payouts below a threshold dollar amount may be paid via coin hopper 136 while larger payouts are paid via a printed ticket).

In one embodiment, gaming machine 102 includes loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, a free room upgrade, discounts, etc.).

Figure 2:
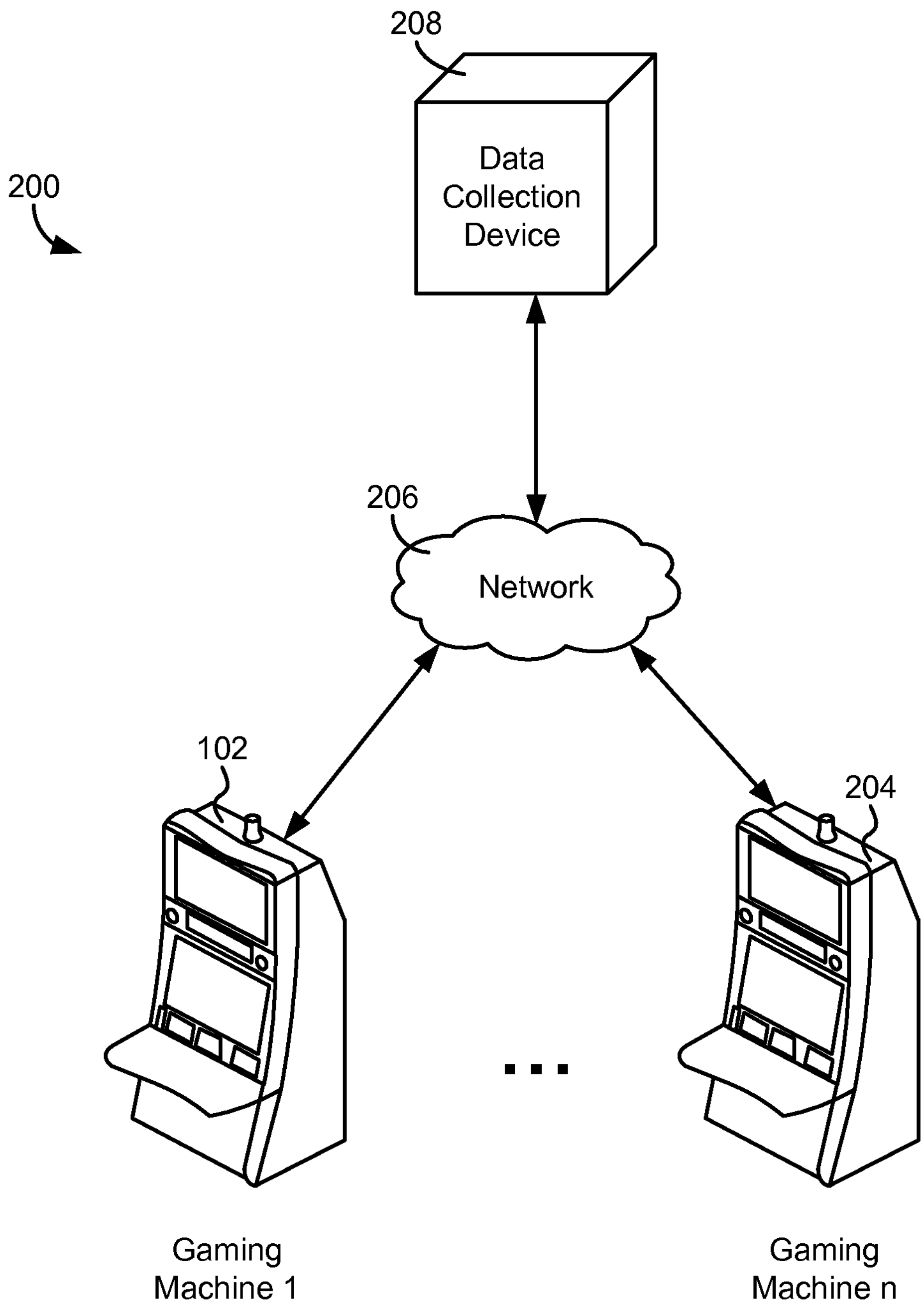
FIG. 2 is a view of a gaming system, according to an exemplary embodiment.

Referring now to FIG. 2, an illustration of a gaming system 200 is shown, according to an exemplary embodiment. Gaming system 200 may be within, for example, a casino, a racetrack, a hotel, or other entertainment location. As shown, gaming system 200 may include any number of gaming machines. For example, gaming system 200 may include gaming machine 102 shown in FIG. 1 through a gaming machine 204 (i.e., a first gaming machine through nth gaming machine). Gaming system 200 may also include a network 206 through which gaming machines 102, 204 communicate with a repository 208. In some embodiments, gaming machines 102, 204 may also communicate with each other via network 206.

Network 206 may be any form of communications network that conveys data between gaming machines 102, 204 and repository 208. Network 206 may include any number of wired or wireless connections. For example, repository 208 may communicate over a wired connection that includes a serial cable, a fiber optic cable, a CAT5 cable, or any other form of wired connection. Similarly, repository 208 may communicate via a wireless connection (e.g., via WiFi, cellular, radio, etc.). Network 206 may also include any number of intermediary networking devices, such as routers, switches, servers, etc.

Repository 208 may be one or more electronic devices connected to network 206 configured to collect data from gaming machines 102, 204. For example, repository 208 may be a single computer, a collection of computers, or a data center. Repository 208 may include one or more data storage devices in communication with one or more processors. The data storage devices may store machine instructions that, when executed by the one or more processors, cause the one or more processors to perform the functions described with regard to repository 208. Generally, repository 208 is configured to receive and store data regarding gaming machines 102, 204 and to provide the data to a user interface (e.g., a display, a handheld device, etc.). In some cases, repository 208 may perform data analysis on the received data. For example, repository 208 may determine averages, trends, metrics, etc., for one or more of gaming machines 102, 204. Data may be sent by gaming machines 102, 204 to repository 208 in real-time (e.g., whenever a change in credits or cash occurs, whenever another type of system event occurs, etc.), periodically (e.g., every fifteen minutes, every hour, etc.), or in response to a request from repository 208.

The data received by repository 208 may include operational data. In general, operational data may be any other form of data indicative of the operational state of gaming machines 102, 204. For example, operational data may include data indicative of the number of games played on gaming machines 102, 204, the types of games played on gaming machines 102, 204, errors or alerts generated by gaming machines 102, 204, whether gaming machines 102, 204 are currently in use, etc. Repository 208 may use the received operational data to allow gaming machines 102, 204 to be monitored. Repository 208 may also provide notifications, if maintenance is required for any of gaming machines 102, 204. For example, a notification may be sent to a display (e.g., a display attached to repository 208, a display of a handheld device operated by a technician, etc.), so that an error may be corrected.

In some embodiments, the data received by repository 208 may include data related to a user's loyalty account. For example, a user of gaming machine 102 may link their loyalty account to gaming machine 102, so that she can gain loyalty points, free turns, etc., while playing gaming machine 102. A user may link his or her loyalty account to gaming machine 102 in any number of ways. For example, the user may insert a loyalty card into gaming machine 102 and/or provide biometric data to gaming machine 102 (e.g., by conducting a finger print scan, a retinal scan, etc.). In some cases, a mobile device operated by the user may provide data regarding the user's loyalty account to gaming machine 102. The mobile device may transfer data to gaming machine 102 wirelessly (e.g., via Bluetooth, WiFi, etc.), via a wired connection (e.g., via a USB cable, a docking station, etc.), via the user's body (i.e., the mobile device transmits data through the user's body and into gaming machine 102), or in another manner. Repository 208 may then associate the user's time playing gaming machine 102 with the user's loyalty account (e.g., to add loyalty points to the user's account, to provide certain rewards to the user, such as a bonus turn, etc.).

Repository 208 may provide data to gaming machines 102, 204 via network 206. For example, repository 208 may notify a user of gaming machine 102 that the user qualifies for a loyalty award, such as a free meal, a free night in a hotel, a discount, a bonus turn, and so on. In some cases, repository 208 may provide a service window to gaming machines 102, 204. For example, the service window may appear within a Flash application executed by gaming machines 102, 204 via the lower display of the machines. A service window may allow notifications to be provided by repository 208 to an individual user during game play.

Figure 3:
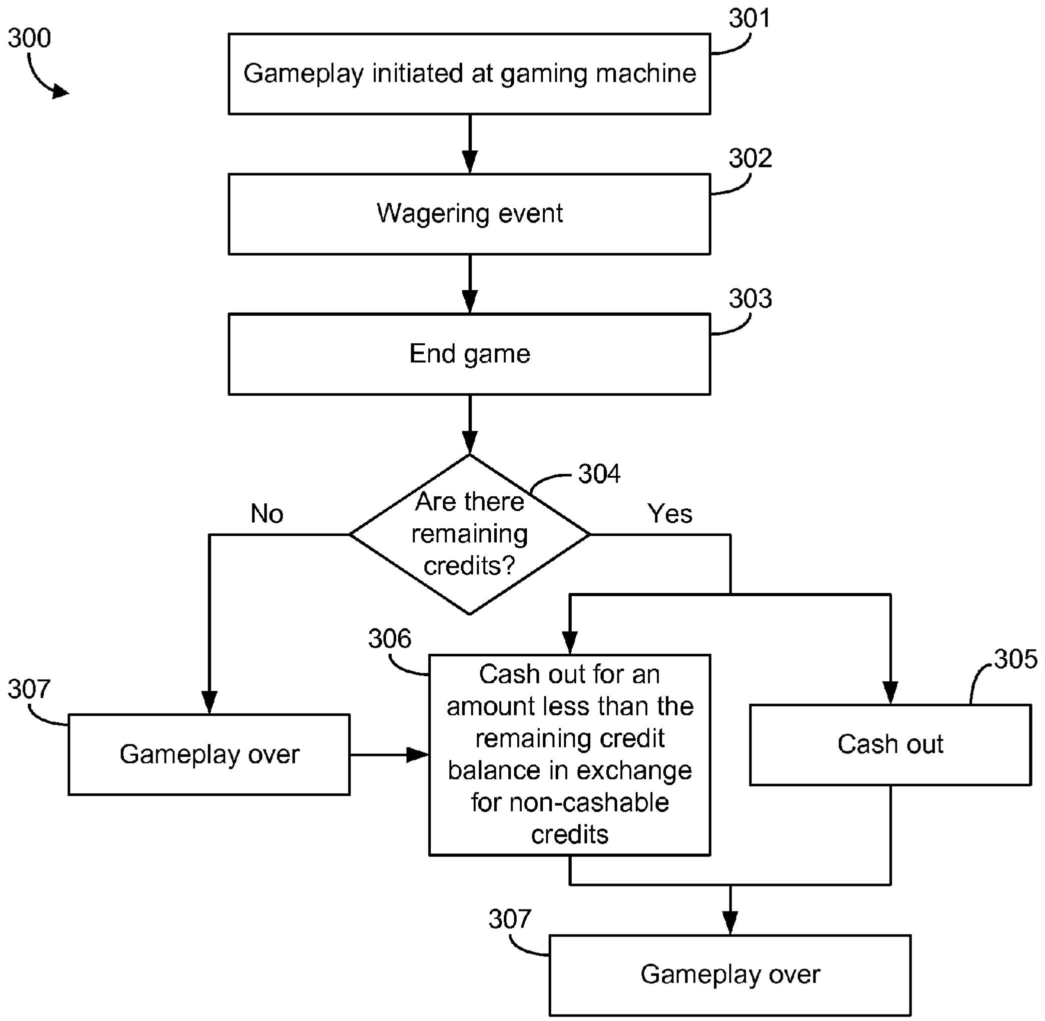
FIG. 3 is a flow chart of providing a non-cashable credit cash out option to a player of a gaming machine, according to an exemplary embodiment.

Referring to FIG. 3, a flow chart 300 of providing a non-cashable credit cash out option to a player of a gaming machine 102 is shown, according to an example embodiment. Flowchart 300 includes a number of steps but is not limited to these steps and is not necessarily performed in the order indicated. In the example in FIG. 3, the process may be initiated at 301, for example, when a player initiates a gaming session at gaming machine 102 by, e.g., inserting a ticket, cash, loyalty card, account card, etc., into the gaming machine 102. Upon initiating the gaming session, in an example embodiment, the player's inputted currency is converted into wagerable credits. The player then wagers a desired amount of those credits at 302. The wagering event can include a game. For example, the player may pull an arm or push a button on the gaming machine, causing a wagering event to occur (e.g., a spinning of slot machine reels). The wagering game then generates results, wherein the player may gain or lose credits thereby affecting the player's overall credit balance.

After playing the game for a while, the player may choose to end the game at 303. Assuming the player has a positive (i.e., above zero) remaining credit balance (304), the player is presented with two options. First, the player can choose the traditional cash out method at 305. Here, the gaming machine converts the player's remaining credit balance into money and dispenses it to the player in the form of, e.g., cash, tokens, prizes, a redeemable ticket, voucher, receipt, etc.

Second, according to an exemplary embodiment, at 306, the player can choose the option of cashing out by receiving a lower amount of currency than their remaining credit balance in exchange for an additional amount non-cashable credits. For example, if the player has a remaining credit balance of $20.00, they can elect to cash out for $15.00 in cash and $10.00 in non-cashable credits. The $10.00 in non-cashable credits may be spent by the player to play the same number of games that could be played with $10.00 of actual currency. Hence, by taking a lower amount of currency, the player is compensated with additional playing (non-cashable) credits. The non-cashable credits may be credited back to the player's loyalty card, printed on a cash out ticket or receipt, or otherwise credited back to the player's account. In an exemplary embodiment, the non-cashable extra credits may not be redeemable for money. Rather, they are intended to provide the player with additional credits to be played on the same or other electronic gaming machines. According to various embodiments, the credits may be used for discounts at casino-owned restaurants, entertainment venues, etc.

Still referring to FIG. 3, in some situations, the player may have zero credits remaining (304), in which case there is nothing to "cash out." In some instances, the game play may then be over at 307. However, in other embodiments, the gaming machine may still provide that player with additional non-cashable credits (306). Even though the player may have lost all their credits, the player may be compensated by at least getting some free credits to continue playing the game. Casinos and entertainment locations may choose to always provide players with additional non-cashable credits in order to improve and maintain positive guest relations.

The amount of non-cashable credits provided to a player can be based on a variety of factors. For example, the longer a player played the game may correlate with more credits. In another example, the higher the player's winnings, the more non-cashable credits the player may receive. These policies and procedures can be set by the manufacturer, the casino, or entertainment location operators. In another embodiment, casino and entertainment location operators may award higher amounts of non-cashable credits to a player if that player plays certain designated games, plays games at other participating locations, and so on.

As such, the amount of additional non-cashable credits provided to a player is highly customizable. For example, after the player chooses to cash out, the controller (e.g., processor) of the gaming machine may present several options to the player. One option may be a default wherein the player receives a default amount of additional credits (e.g., player cashes out for $20.00 and receives $4.00 in non-cashable credits, or cashes out for $100.00 and receives $4.00 in non-cashable credits, and so forth). In another embodiment, the default may be set to a percentage (or, e.g., a multiple) of the cash exchanged for credits plus the amount of forgone cash value. Using the above example where $20.00 was cashed out for $15.00 in cash, the additional credits may be twenty-five percent of $5.00 (e.g., $5.00+0.25*5.00=$6.25 in non-cashable credits rather than $10.00 in non-cashable credits). As another example, the greater the amount of credits the player does not exchange for currency equates to a greater amount of received non-cashable credits. For example, if the player has $20.00 in remaining credit balance available and cashes out for $15.00, the player may receive $10.00 in non-cashable credits. However, if the player cashes out for $10.00, that player may receive $20.00 in non-cashable credits.

According to an exemplary embodiment, the player can only exchange currency for non-cashable credits based on their remaining credits from the wagering event. For example, if the player has $20.00 in remaining credit balance, the player may only exchange up to $20.00 for additional non-cashable credits. The player may not buy additional non-cashable credits at the value at which they are offered to the player because these values are greater than the normal currency-to-credits exchange rate. In other embodiments, such exchanges may be made.

According to an alternative embodiment, the amount of additional non-cashable credits can be based on a second wagering event. For example, at the completion of the primary wagering event, a second game (e.g., a slot machine game) may appear on the display screen. The player then initiates the second game by wagering some of their remaining credits to generate results. Like above, the player is required to forgo some of their remaining cash credit prior to being provided with additional non-cashable credits. At completion of the second wagering game, the results may include additional non-cashable credits the player just "won." For example, a player may wager $5.00 in credits that they did not cash out for currency and may be guaranteed to receive at least $5.00 in non-cashable credits. But, the player may be provided with the possibility to win much more through the second wagering game than their initial wagered amount (e.g., $100.00 in non-cashable credits instead of $5.00 in non-cashable credits). Furthermore, in this example, the second wagering game may be displayed on display 122, but it may also be displayed on display 110 as well. This second game may also take place remotely, such that the player may use a computing device to play the second game and obtain non-cashable credits. Thus, the gaming machine may allow the player to postpone obtaining their non-cashable credits until a later time.

The extra non-cashable credits encourages players to play another game and/or stay in the casino or entertainment location longer. As such, casinos and entertainment locations receive the benefit of having customers in their establishments for longer periods of time without offering them actual cash enticements. Furthermore, this offer allows the player to continue to play with a perceived amount of "free" money. In turn, casinos and entertainment locations may improve their guest relations because of this perceived "free money" allotment to customers.

According to one embodiment, the non-cashable credits may be used with only certain electronic gaming machines. For example, these credits may be configured to only be used with slot machines and no other types; or, only with designated gaming machines; etc. In another embodiment, the credits are specific to the casino or entertainment location, such that they may only be redeemed in the location where they were earned. In an alternative embodiment, the credits may be used at any one of multiple participating locations. According to various other embodiments, additional non-cashable credits may only be made available to certain players (e.g., new gaming players, frequent visitors, etc.), certain days and times of the week, holiday promotions, etc.

In an alternative embodiment, additional non-cashable credits may be used in connection with non-electronic gaming machines. For example, when a player cashes out from a blackjack table, that player may also be given a receipt for additional non-cashable credits. Thus, when the player goes to an electronic gaming machine and inserts currency to play, that person may use the additional non-cashable credits they received from the blackjack table to play the gaming machine longer.

According to an exemplary embodiment, the non-cashable credits may be stored on a player's account indefinitely. Threshold amounts of non-cashable credits may be set by casinos or other entertainment locations for which prizes may be awarded if those thresholds are met (e.g., a free hotel night stay, a free dinner, concierge service for a day, etc.). Moreover, the player may access their non-cashable credit balance remotely to determine how much he or she has/needs in order to reach the desired threshold amount. As another example, if the gaming system provides for remote play and operation, the player may redeem their non-cashable credits from a remote location away from the electronic gaming machine and casino or entertainment location. According to another embodiment, the non-cashable credits may only be usable for a limited amount of time. As such, the player may have a set amount of time within which to use those credits in order to gain their benefit. The lifespan of the credits may be set by casino operators, machine manufacturers, and other controllers of the gaming machines and systems. Casino operators may prefer limited lifespans in order to prevent the accrual of large sums of non-cashable credits. In another embodiment, operators may prescribe that the non-cashable credits decrease by a percentage or variable amount over time. For example, if the non-cashable credits are used within a prescribed amount of time from receipt, they are worth their full value. But, if the credits are not used within that prescribed amount of time, their value may decrease by fifty-percent (e.g., the patron is given four non-cashable credits and if the patron uses them within twenty-four hours, their value is $4.00 in non-cashable credits; if the patron does not use them within two weeks but within four weeks, their value is $2.00 in non-cashable credits). In addition, casino operators (or others) may set a maximum number of non-cashable credits that can be obtained. Moreover, the transferability of the non-cashable credits may also be prescribed. For example, the casino operators may not allow non-cashable credits to be transferred from one player to another player.

After receiving the additional non-cashable credits, the player may then utilize them to play another wagering game. According to an exemplary embodiment, the player must spend additional currency to play another (or the same) gaming machine prior to the additional non-cashable credits becoming available for use. For example, if the player has $5.00 in non-cashable credits, the $5.00 in non-cashable credits alone will not initiate game play. Rather, the player must input $5.00 in cashable credits into the gaming machine prior to the $5.00 in non-cashable credits becoming available. According to an exemplary embodiment, the player must input currency equal to or more than the amount of non-cashable credits that the player desires to use (e.g., at least $5.00 into the gaming machine to use $5.00 in non-cashable credits). But, once the $5.00 in cashable credits have been entered, the non-cashable credits can be used to prolong game play. According to an example embodiment, the non-cashable credits may be available for use without inputting additional currency into the gaming machine. As such, the additional non-cashable credits can initiate game play on their own, without the added player currency.

According to another embodiment, the amount inputted into the gaming machine may be less than the amount of non-cashable credits that the player wants to use. In other embodiments, the amount of inputted currency required may be set by casino and entertainment location operators. Moreover, the amount required can vary based on the amount of non-cashable credits that the player wants to apply; the frequency of play by the player; the average amount wagered by the player; casino and entertainment location promotions; etc. According to another embodiment, losses are incurred against the cashable credit first, and the non-cashable credit is used to replenish the cashable credit only after the cashable credit is consumed via the losses. For example, in the above example, the $5.00 in cashable credit is consumed first and, only after the $5.00 in cashable credit has been consumed does the $5.00 in non-cashable credit get used for wagering. If the player cashes out, any further awards of non-cashable credit may be based on the then-existing cashable credit balance (e.g., and not take into account the non-cashable credit balance).

Figure 4:
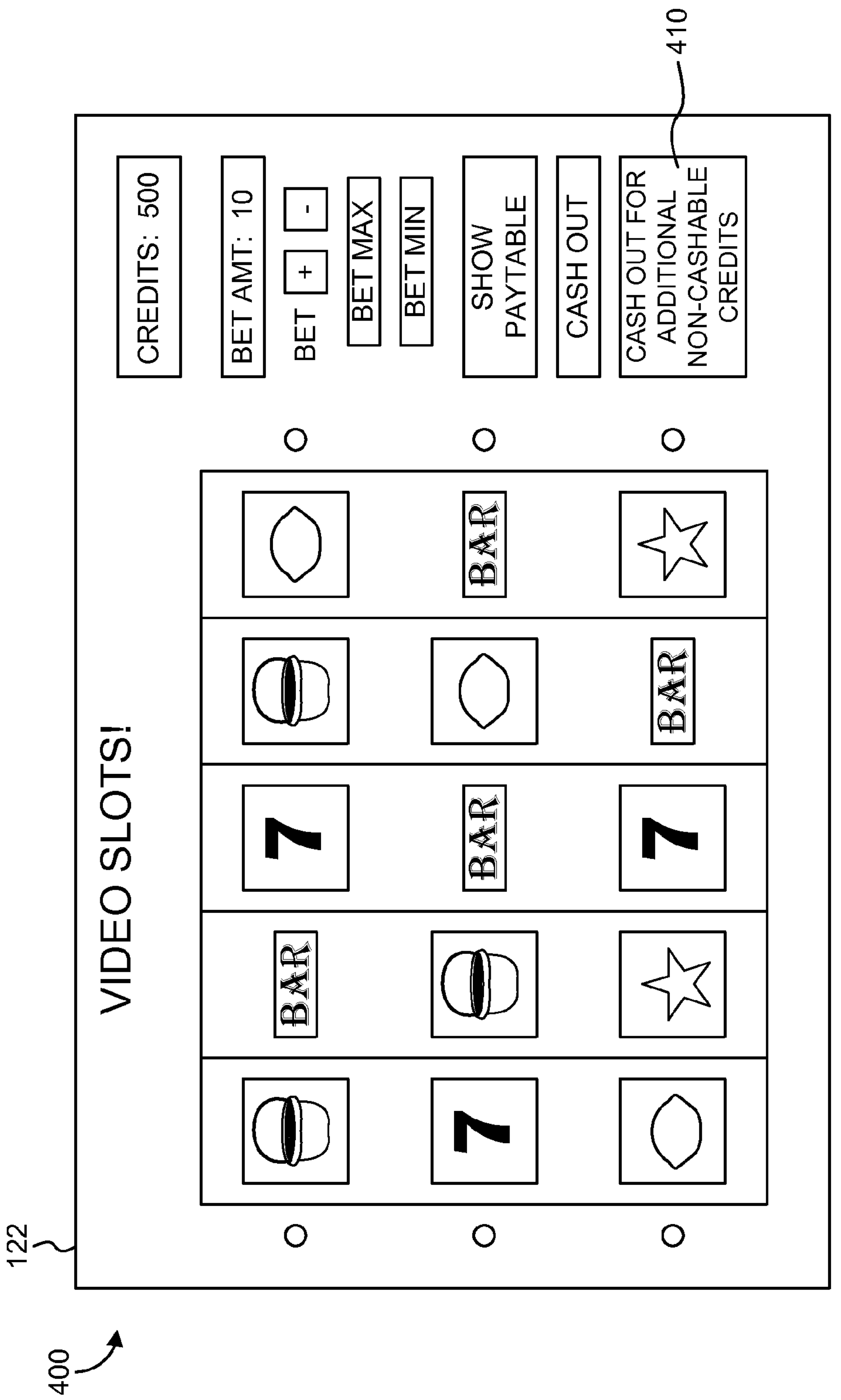
FIG. 4 is a view of a video slot game presented on a gaming machine, according to an exemplary embodiment.
Figure 5:
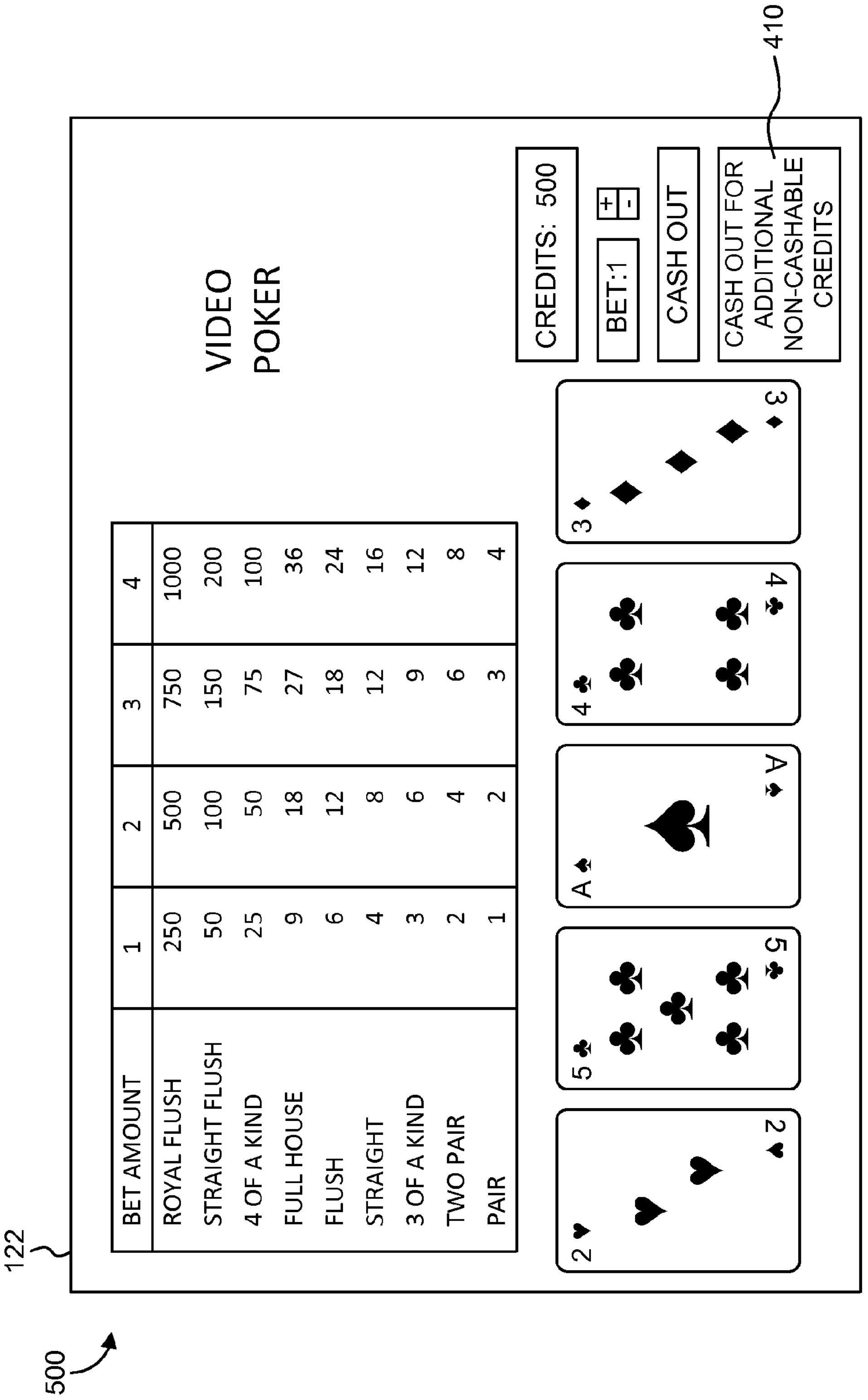
FIG. 5 is a view of a video poker game presented on a gaming machine, according to an exemplary embodiment.

Referring to FIG. 4, a view 400 of a video slot game presented on display 122 of a gaming machine 102 is shown, according to an exemplary embodiment. Referring to FIG. 5, a view 500 of a video poker game presented on a display 122 of a gaming machine 102 is shown, according to an exemplary embodiment. FIGS. 4 and 5 show “additional non-cashable credits cash out” touchscreen buttons 410, wherein the player can cash out of the wagering game for additional non-cashable credits. According to another embodiment, the cash out for additional non-cashable credits option may be employed via an input button 134 on gaming machine 102 from FIG. 1. After choosing this option, another screen may appear allowing the customer to choose how much currency they would like back and how much currency stays with the machine in exchange for non-cashable credits.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing agent. Alternatively or in addition, the program instructions can be encoded on an artificially-generated propagated signal, e.g., a machine-generated electrical, optical, or electromagnetic signal, that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term “client or “server” include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should further be noted that for purposes of this disclosure, the term "couple" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or, alternatively, may be removable or releasable in nature.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of operating a gaming system, said method comprising:

receiving, by an acceptor, a physical item associated with a monetary value, the physical item being one of a ticket and currency;

establishing, by at least one processor, a first credit balance based on the monetary value associated with the received physical item and initiating, by the at least one processor, a gaming session;

receiving an actuation of a wager button;

responsive to the received actuation of the wager button, placing, by the at least one processor, a wager on a play of a wagering game;

reducing, by the at least one processor, the first credit balance based on the placed wager;

randomly determining, by the at least one processor, an outcome for the play of the wagering game;

if the randomly-determined outcome is associated with an award, increasing, by the at least one processor, the first credit balance based on the award;

receiving an actuation of a cashout button; and responsive to the received actuation of the cashout button, terminating, by the at least one processor, the gaming session and initiating, by the at least one processor, a payout including: (1) an amount of non-cashable credits in lieu of a first portion of some but not all of the first credit balance, and (2) a monetary value representing a remaining second portion of the first credit balance, wherein the non-cashable credits cannot be used to initiate a play of a game during a subsequent gaming session unless a second quantity of credits representing a deposit of value in addition to any non-cashable credits has first been wagered on one or more plays of the game in the subsequent gaming session, the second quantity of credits determined based on the amount of non-cashable credits.

2. The method of claim 1, wherein the second quantity of credits is at least equal to the amount of non-cashable credits.

3. The method of claim 1, wherein the second quantity of credits is less than the amount of non-cashable credits.

4. The method of claim 1, wherein the second quantity of credits is greater than the amount of non-cashable credits.

5. The method of claim 1, wherein the amount of non-cashable credits is a multiple of the first portion of the first credit balance.

6. The method of claim 1, wherein the amount of non-cashable credits is a multiple of the second portion of the first credit balance.

7. The method of claim 1, wherein the amount of non-cashable credits is a predetermined amount regardless of the second portion of the first credit balance.

8. The method of claim 1, wherein the amount of non-cashable credits is a predetermined amount regardless of the first portion of the first credit balance.

9. The method of claim 1, wherein the non-cashable credits expire after a prescribed amount of time.

10. A non-transitory computer-readable medium storing a plurality of instructions that, when executed by at least one processor, cause the at least one processor to:

establish a first credit balance based on a monetary value associated with a physical item following receipt of the physical item by an acceptor, the physical item being one of a ticket and currency;

initiate a gaming session;

place a wager on a play of a wagering game following an actuation of a wager button;

reduce the first credit balance based on the placed wager;

randomly determine an outcome for the play of the wagering game;

if the randomly-determined outcome is associated with an award, increase the first credit balance based on the award; and following an actuation of a cashout button, terminate the gaming session and initiate a payout including: (1) an amount of non-cashable credits in lieu of a first portion of some but not all of the first credit balance, and (2) a monetary value representing a remaining second portion of the first credit balance, wherein the non-cashable credits cannot be used to initiate a play of a game during a subsequent gaming session unless a second quantity of credits representing a deposit of value in addition to any non-cashable credits has first been wagered on one or more plays of the game in the subsequent gaming session, the second quantity of credits determined based on the amount of non-cashable credits.

11. The non-transitory computer readable medium of claim 10, wherein the second quantity of credits is at least equal to the amount of non-cashable credits.

12. The non-transitory computer readable medium of claim 10, wherein the second quantity of credits is greater than the amount of non-cashable credits.

13. The non-transitory computer readable medium of claim 10, wherein the second quantity of credits is less than the amount of non-cashable credits.

14. The non-transitory computer readable medium of claim 10, wherein the amount of non-cashable credits is a multiple of the first portion of the first credit balance.

15. The non-transitory computer readable medium of claim 10, wherein the amount of non-cashable credits is a multiple of the second portion of the first credit balance.

16. The non-transitory computer readable medium of claim 10, wherein the amount of non-cashable credits is a predetermined amount regardless of the second portion of the first credit balance.

17. The non-transitory computer readable medium of claim 10, wherein the amount of non-cashable credits is a predetermined amount regardless of the first portion of the first credit balance.

18. The non-transitory computer readable medium of claim 10, wherein the non-cashable credits expire after a prescribed amount of time.

19. A gaming machine comprising:

a housing;

at least one display device supported by the housing;

a plurality of input devices supported by the housing and including an acceptor;

at least one processor; and at least one memory device that stores a plurality of instructions that, when executed by the at least one processor, cause the at least one processor to operate with the at least one display device and the plurality of input devices to:

establish a first credit balance based on a monetary value associated with a physical item following receipt of the physical item by an acceptor, the physical item being one of a ticket and currency;

initiate a gaming session;

place a wager on a play of a wagering game following an actuation of a wager button;

reduce the first credit balance based on the placed wager;

randomly determine an outcome for the play of the wagering game;

if the randomly-determined outcome is associated with an award, increase the first credit balance based on the award; and following an actuation of a cashout button, terminate the gaming session and initiate a payout including: (1) an amount of non-cashable credits in lieu of a first portion of some but not all of the first credit balance, and (2) a monetary value representing a remaining second portion of the first credit balance, wherein the non-cashable credits cannot be used to initiate a play of a game during a subsequent gaming session unless a second quantity of credits representing a deposit of value in addition to any non-cashable credits has first been wagered on one or more plays of the game in the subsequent gaming session, the second quantity of credits determined based on the amount of non-cashable credits.

20. The gaming machine of claim 19, wherein the second quantity of credits is at least equal to the amount of non-cashable credits.

21. The gaming machine of claim 19, wherein the second quantity of credits is greater than the amount of non-cashable credits.

22. The gaming machine of claim 19, wherein the second quantity of credits is less than the amount of non-cashable credits.

23. The gaming machine of claim 19, wherein the amount of non-cashable credits is a multiple of the first portion of the first credit balance.

24. The gaming machine of claim 19, wherein the amount of non-cashable credits is a multiple of the second portion of the first credit balance.

25. The gaming machine of claim 19, wherein the amount of non-cashable credits is a predetermined amount regardless of the second portion of the first credit balance.

26. The gaming machine of claim 19, wherein the amount of non-cashable credits is a predetermined amount regardless of the first portion of the first credit balance.

27. The gaming machine of claim 19, wherein the non-cashable credits expire after a prescribed amount of time.

* * * * *